(12) United States Patent
Sommese et al.

(10) Patent No.: US 11,651,474 B2
(45) Date of Patent: May 16, 2023

(54) REAL-TIME SUPER RESOLUTION AT LONG STANDOFF RANGES

(71) Applicant: BAE SYSTEMS Information and Electronic Systems Integration Inc., Nashua, NH (US)

(72) Inventors: Anthony M. Sommese, Eatons Neck, NY (US); Daniel Engheben, Commack, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 420 days.

(21) Appl. No.: 17/088,629

(22) Filed: Nov. 4, 2020

(65) Prior Publication Data
US 2022/0138905 A1    May 5, 2022

(51) Int. Cl.
| | |
|---|---|
| *G06T 3/40* | (2006.01) |
| *H04N 23/951* | (2023.01) |
| *G06T 1/20* | (2006.01) |
| *H04N 1/40* | (2006.01) |
| *H04N 23/695* | (2023.01) |
| *G02B 27/01* | (2006.01) |

(52) U.S. Cl.
CPC .............. *G06T 3/4053* (2013.01); *G06T 1/20* (2013.01); *H04N 1/40068* (2013.01); *H04N 23/695* (2023.01); *H04N 23/951* (2023.01); *G02B 2027/0147* (2013.01); *G09G 2340/04* (2013.01); *H04N 2201/325* (2013.01); *H04N 2201/3252* (2013.01)

(58) Field of Classification Search
None
See application file for complete search history.

(56) References Cited

U.S. PATENT DOCUMENTS

| | | | | |
|---|---|---|---|---|
| 6,359,681 | B1 * | 3/2002 | Housand | G02B 23/00 250/342 |
| 7,633,429 | B1 * | 12/2009 | Liu | G01S 13/4445 342/107 |

(Continued)

FOREIGN PATENT DOCUMENTS

WO    2013171738    11/2013

OTHER PUBLICATIONS

Super Resolution Imaging, Wikipedia, https://en.wikipedia.org/wiki/Super-resolution_imaging, accessed Sep. 3, 2020.

(Continued)

*Primary Examiner* — Dov Popovici
(74) *Attorney, Agent, or Firm* — KPIP Law, PLLC

(57) ABSTRACT

The system and method for super resolution processing at long standoff distances in real-time. The system collects a series of image frames and estimated the shift, rotation, and zoom parameters between each of the image frames. A matrix is generated and then an inversion is applied to the matrix to produce a super resolution image of an area of interest while mitigating the effect of any bad pixels on image quality. In some cases, the area of interest is user-defined and in some cases image chips are provided by tracking software. A fast steering mirror can be used to steer and/or dither the focal plane array.

20 Claims, 8 Drawing Sheets

(56) References Cited

U.S. PATENT DOCUMENTS

| | | | |
|---|---|---|---|
| 9,041,898 B1 * | 5/2015 | Reilly | G01C 11/025 348/146 |
| 9,225,889 B1 | 12/2015 | Korkin | |
| 9,531,843 B1 | 12/2016 | Young et al. | |
| 10,116,863 B2 | 10/2018 | Lane | |
| 10,432,866 B2 | 10/2019 | Robinson et al. | |
| 2007/0036467 A1 | 2/2007 | Coleman et al. | |
| 2012/0113119 A1 | 5/2012 | Massie | |
| 2013/0235199 A1 | 9/2013 | Nixon | |
| 2015/0288892 A1 | 10/2015 | Frank et al. | |
| 2016/0309084 A1 | 10/2016 | Venkataraman et al. | |

OTHER PUBLICATIONS

International Search Report, PCT/US21/57807, dated Jan. 28, 2022, 9 pages.

* cited by examiner $$\begin{bmatrix} I_1 \\ I_2 \\ \vdots \\ I_n \end{bmatrix} = H \; b \qquad J = \sum (b_i - \hat{b}_i)^2$$

$I_i$ – $i_{th}$ Image
b – High Resolution Background
H – Relates Background Intensity to Detector Intensity (Very Sparse)

FIG. 2

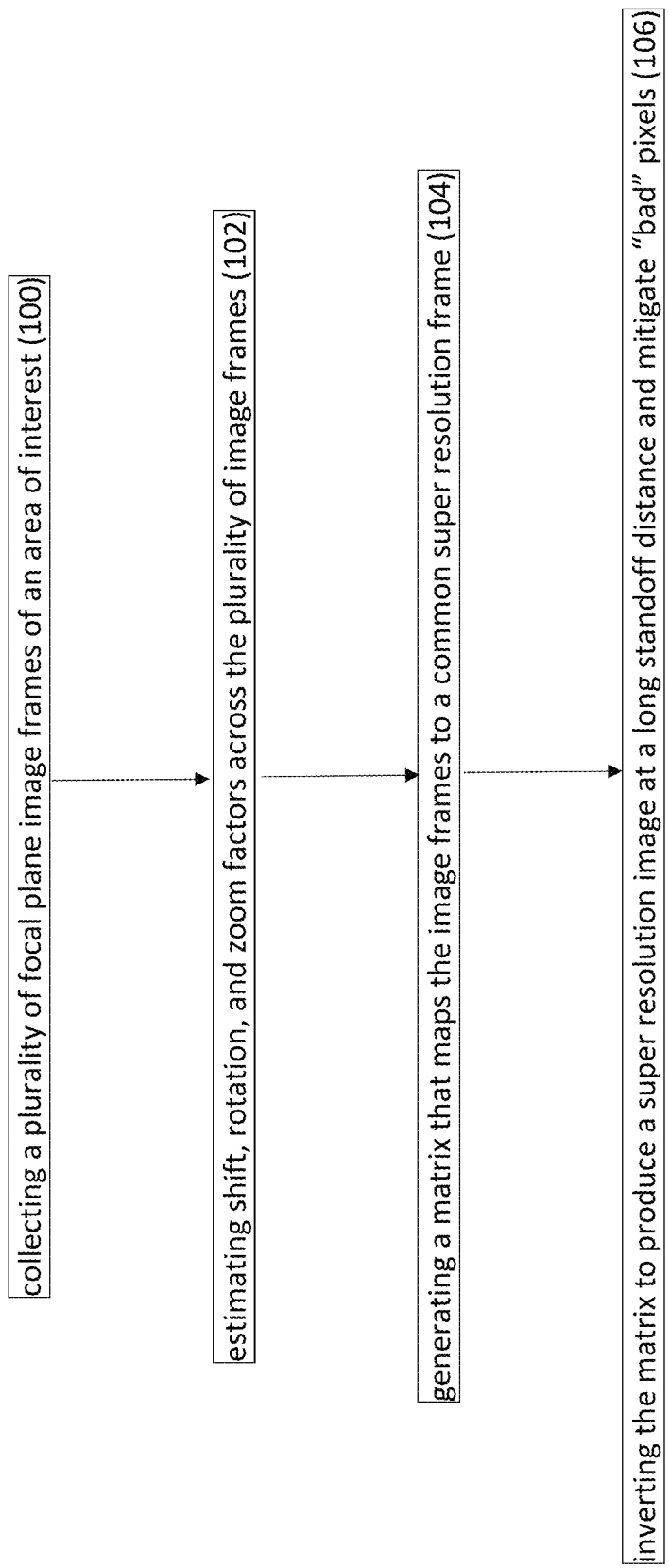

REAL-TIME SUPER RESOLUTION AT LONG STANDOFF RANGES

FIELD OF THE DISCLOSURE

The present disclosure relates to wide area motion imagery and more particularly to a systems approach (i.e., hardware, software, user interface, and control) to provide real-time super resolution techniques at long standoff ranges (>20 nautical miles) enabling better performance at lower signal-to-noise ratios (SNRs) and/or with smaller, and therefore cheaper, optical systems.

BACKGROUND OF THE DISCLOSURE

For passive sensors, a detector's instantaneous field-of-view (IFOV) is chosen depending on a required ground sample distance (GSD) for a particular application, while the aperture size is chosen to provide a desired, specified signal-to-noise ratio (SNR). For high spatial resolution and good SNR at long standoff ranges (e.g., 20 nautical miles) a large optical system is typically required. In addition, given limited payload space when developing a sensor there are often performance trade-offs between the desire for a larger field-of-regard (FOR) (e.g., >25°×25°), a faster revisit time (e.g., >2 Hz), and smaller GSD, as well as the SNR provided by the system.

Newer advanced wide area motion imagery (WAMI) efforts have integrated a large format IR array with a state-of-the-art fast steering mirror (FSM) to provide an agile sensor that can cover a large FOR at high revisit rates. In certain embodiments, the large format array has >4K pixels×4K pixels. Combining advanced WAMI sensor technology with a real-time super resolution algorithm as described herein can ease some sensor design trade-offs mentioned above and allow for less costly sensor solutions all with improved performance at long standoffs. Wherefore it is an object of the present disclosure to overcome the above-mentioned shortcomings and drawbacks associated with conventional sensor systems.

SUMMARY OF THE DISCLOSURE

One aspect of the present disclosure is a system for producing super resolution wide area motion images, comprising: a focal plane array, configured for collection of a plurality of focal plane images; a fast steering mirror (FSM) configured to steer an image field of view (FOV) to an area of interest; and a super resolution module, configured to: estimate shifts, rotations, and zooms between each image in the plurality of focal plane images about the area of interest; generate a matrix that relates the plurality of focal plane images to a common super resolution image frame; invert the matrix and mitigate impact of any bad pixels on image quality; and produce a super resolution image of the area of interest in real-time and at a long standoff distance.

One embodiment of the system for producing super resolution wide area motion images is wherein a long standoff distance is about 20 nautical miles. In some cases, the focal plane array is a large format array configured for use in the mid-wave infrared range. In certain embodiments, the focal plane array is configured for day/night detection.

Another embodiment of the system for producing super resolution wide area motion images is wherein the focal plane array is configured for collection of multiple frames on multiple objects from a user supplied tracking algorithm.

Yet another embodiment of the system for producing super resolution wide area motion images is wherein the fast steering mirror (FSM) is configured to dither the focal plane array to collect diverse projections on an object in the area of interest. In some cases, the focal plane array is configured for higher sample rates by cutting down its field of view.

In certain embodiments, GPU/FPGA hardware implements generation of the matrix in real-time using parallel processing.

Still yet another embodiment of the system for producing super resolution wide area motion images further comprises a user interface to allow for selection of an area of interest and a desired frame rate. In some cases, the system for producing super resolution wide area motion images further comprises an application programming interface (API) that allows a user to provide an automated tracking algorithm to assemble detections and small image chips (sub-frames) on objects of interest.

Another aspect of the present disclosure is a method for real-time super resolution processing, comprising: collecting a plurality of focal plane image frames of an area of interest; estimating shift, rotation, and zoom factors across the plurality of image frames; generating a matrix that maps the image frames to a common super resolution frame; and inverting the matrix to produce a super resolution image at a long standoff distance that mitigates impact of any bad pixels on image quality.

One embodiment of the method is wherein a long standoff distance is about 20 nautical miles.

Another embodiment of the method is wherein the focal plane images are collected via a large format array configured for use in the mid-wave infrared range. In some cases, the focal plane images are collected via a large format array configured for day/night detection.

Yet another embodiment of the method is wherein the image frames are collected either by a user specifying an area-of-interest (AOI) to be processed, or via a user-supplied, automated algorithm that assembles detections on objects of interest over time, along with their associated image chips. In some cases, a focal plane array is configured for collection of multiple frames on multiple objects using a user supplied tracking algorithm.

Still yet another embodiment of the method further comprises steering an image field of view (FOV) to a user specified area of interest using a fast steering mirror (FSM). In some cases, a fast steering mirror (FSM) is configured to dither a focal plane array to collect diverse projections on an object in the area of interest. In certain embodiments, the large format array is configured for higher sample rates by cutting down its field of view.

Certain embodiments of the method further comprise providing an application programming interface (API) that allows a user to provide an automated tracking algorithm to assemble detections and small image chips (sub-frames) on objects of interest.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 2 shows one embodiment of the super resolution formulation of the present disclosure.

FIG. 8 shows a flowchart of one embodiment of a method of using one embodiment of the real-time super resolution system at long standoff ranges according to the principles of the present disclosure.

DETAILED DESCRIPTION OF THE DISCLOSURE

Figure 1:
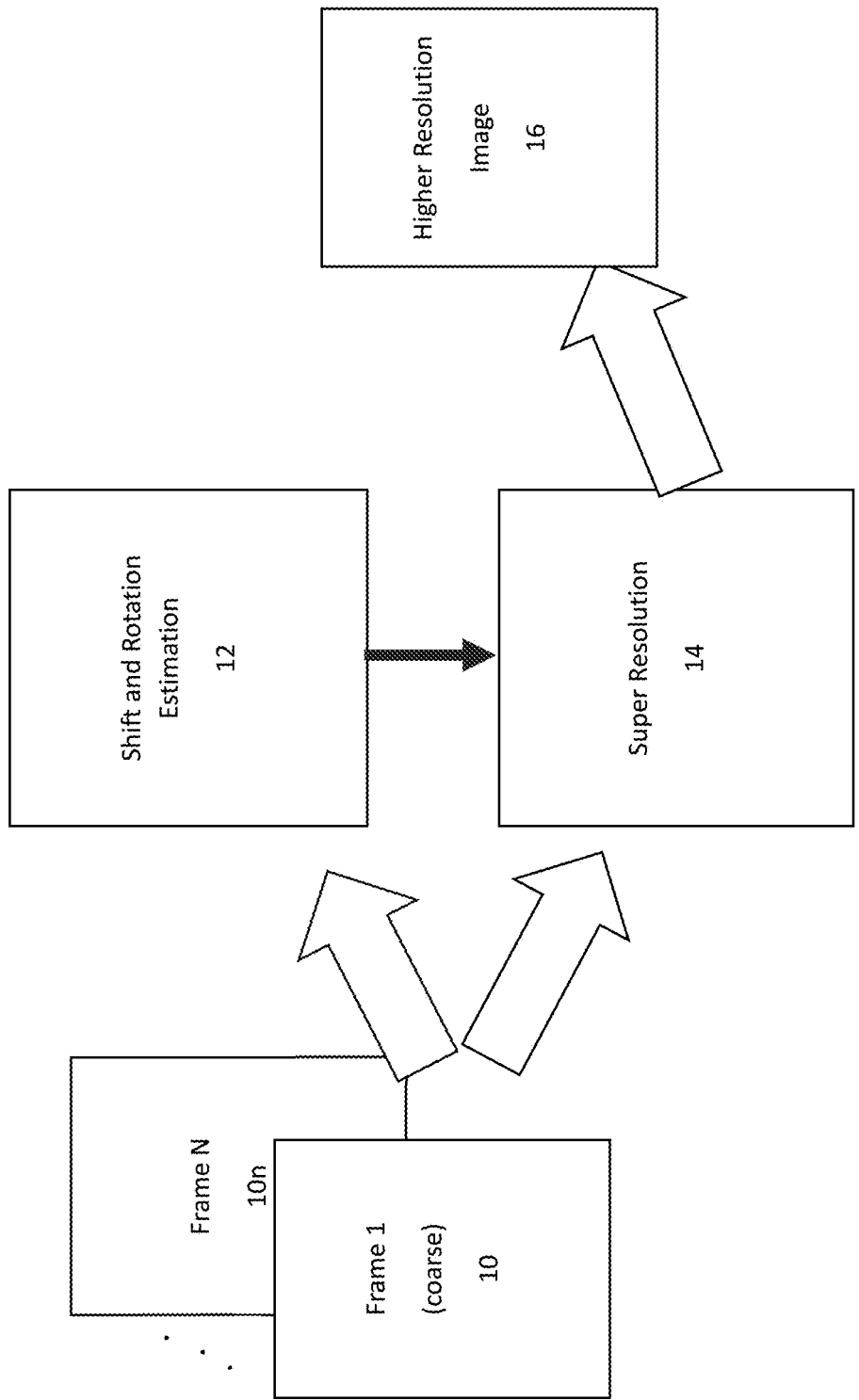
FIG. 1 is a diagrammatic view of one embodiment of the systems approach to super resolution for wide area motion imagery of the present disclosure.

One embodiment of the present disclosure relates to the use of wide area motion imagery (WAMI) sensors at long standoff distances with a real-time super resolution algorithm. In some cases, the standoff distances are about 20 nautical miles, or about 40 km. One embodiment of the super resolution software combines multiple (two or more) images collected over short time intervals (e.g., a few seconds) to improve spatial resolution under lower SNR conditions. In some cases, the signal to noise ratio is more akin to a contrast to noise ratio (CNR) and a low CNR is <about 30. In addition, the system of the present disclosure allows for trading decreased spatial resolution (large IFOV) and smaller optics, with a software solution (additional processing) that improves the spatial resolution and compensates for the loss due to the use of a larger IFOV.

In certain embodiments, the super resolution algorithm takes as input a temporal stack of images of the same object(s). Each image provides a different shifted, zoomed, and rotated projection of the same object(s), and the algorithm combines the different projections to create a higher resolution image (see, e.g., FIG. 1). A stack of images (i.e., two or more) can be collected in a couple of ways. Under normal operation, a first method uses the outputs of an object tracking algorithm. The tracking algorithm assembles associated detections on the same object(s) over time, and for each time frame provides a small image chip of focal plane measurements about the object(s) detection. These image chips are then stacked together as inputs to the super resolution algorithm according to the principles of the present disclosure. A second method places the relevant sensor in a special collection mode where a user may specify a ground area of interest (AOI) and task the sensor with collecting a series of frames over that area. In another embodiment, the sensor collects a series of frames at a high (>12 Hz) temporal rate, where the focal plane may sample faster after cutting down its field of view. After the series of measurement frames are collected, the pixels over the AOI are stacked together and are then provided as inputs to the super resolution algorithm. Certain embodiments of the present method combine many frames of images collected in the same wavelength at the same resolution and rely on the images not being aligned, but rather each image represents different focal plane projections of the same underlying scene (or object).

In certain embodiments, multiple raw frames are combined to produce a super resolution image that has a higher sampling rate and higher resolution than each individual frame. Typically, the aim is to produce a super resolution image that is sampled at five times the spacing of the raw frame; however, this is an adjustable parameter. The increase in resolution depends on sensor design, etc.

Super resolution, as used herein, is computationally intensive. It involves solving the inverse for an exceptionally large sparse matrix, which is ill conditioned. The sparse matrix (see, e.g., FIG. 2) describes the mathematical relationship between the super resolution intensities to be estimated and the sensor measurements that are collected over time. To create the matrix, knowledge of the sensor system modulation transfer function (MTF), the spatial frequency response, as well as a pointing history of the sensor, or estimates of offsets and rotations between different image frames, is required.

Creation of the sparse matrix is also very time consuming. In certain embodiments, parallel processing (multi-threading) is used to compute the matrix very quickly. This approach exploits the fact that the elements of each matrix row are for a given pixel at a given time, and therefore each row can be processed separately in a different thread (or hardware element if a GPU or FPGA is used).

In certain cases, a conjugate gradient approach was chosen to solve the inverse for the matrix because it is iterative and therefore computationally efficient. Also, it searches the most important directions in decreasing priority and can be stopped before searching in the noisy directions, so the method is well suited to handle the ill conditioned nature of the problem.

Different projections of an object occur naturally over time because the platform hosting the sensor is in motion, and sometimes the objects are also in motion. To get added performance out of the system described herein, a fast steering mirror (FSM) can be used to micro-toggle in order to optimize the variability in the projections, which improves the inversion. In some cases, the FSM is a dual axis FSM.

Another advantage of the super resolution approach of the present disclosure is that it has the mathematical formalism needed to incorporate knowledge of any bad pixels, and therefore combine frames in a way that mitigates the impact of any bad pixels on image quality. Since each frame in the stack potentially uses a different set of pixels there are redundant looks at different sections of the object(s), and that redundancy increases the likelihood that there will be a measurement from a good pixel available to provide information. Mitigating bad pixels within the formalism proposed herein is performed by eliminating one or more rows if a certain pixel is deemed to be bad because as noted earlier one row of the sparse matrix relates the super resolution image to a particular sensor pixel. Mitigating the impact of bad pixels is important because pixel operability is a significant cost driver for the large format arrays being used.

In one embodiment, the reason the present approach matters in the IR context is due to the longer wavelengths causing larger diffraction spot sizes (e.g. optical blur), decreases the overall resolution for wide area IR imaging sensors. The various images must remain closely aligned in perspective and require a moderate sample rate (at least a few frames per second) to support the processing. Employing this processing technique while supporting real-time image reporting enhances the effectiveness of the sensor.

The super resolution approach of the present disclosure can significantly lower the cost of the sensor system. By using a gradient search approach in combination with a fully parallelized algorithm to compute a sparse matrix, and state-of-the-art computation hardware, a trade of aperture size and mass for the mass of the computation is permitted, and is not fundamentally limited by the optics physics. By coupling the WAMI sensor mechanics to the super-resolution algorithm of the present disclosure, the motion of the sensor and sensor sampling capabilities support the generation of multiple images for the super-resolution algorithm.

The super resolution approach used in the present approach versus conventional approaches is different. In one embodiment of the present disclosure, the inverse of an exceptionally large but sparse matrix that relates the super resolution image points to the measured pixel intensities (including mitigating the impact of bad pixels) is used, and the computation of this matrix (H) is very costly. In some cases, a technique using parallel processing on a GPU or an FPGA is used or compute the H matrix, which enables real-time execution. The creation of this sparse matrix, as well as an effective super resolution procedure, requires a detailed model of the full sensor system, which takes full advantage of the WAMI design. Another significant distinction is the present disclosure handles moving targets under certain conditions (i.e. against a uniform background). In some cases, prior techniques rely on dithering the array to get different perspectives on the underlying scene, while the present system optionally use an FSM to dither the array but does not require it.

In some embodiments of the system of the present disclosure, image chips from third parties (i.e. tracking software) are used and a method to combine them is also used. The present system utilizes an array that in real-time, by command, reduces its FOV to provide higher read out rates that are faster than video over a large area. In certain embodiments, the array is a large format array, and at a long stand-off distances, the system provides a mechanism to collect many frames quickly, which are needed to mitigate the noise so that better results against lower SNR targets are possible.

The solution described herein allows higher performing, less costly sensor options at long standoff distances compared to existing more traditional solutions by combining a software solution to improve spatial resolution with Applicant's WAMI technology. This advanced WAMI system provides a large FOR (>25°×25°), high frame rate system and combines multiple, near-simultaneous, temporally collected frames to increase spatial resolution thus enabling a sensor designer to trade smaller optics (larger IFOV) for a super resolution system with larger optics (smaller IFOV) and allows for operation within a lower SNR environment. As noted previously, the system mitigates bad pixels, which alleviates costly stringent pixel operability requirements, and operates on a smaller user defined AOI within a FOR and/or on measurement chips supplied by a user-supplied tracking system, which detects objects of interest.

Referring to FIG. 1, a diagrammatic view of one embodiment of the super resolution systems approach of the present disclosure is shown. More specifically, a series of coarse frames $10 \ldots, 10n$ are captured at a high frame rate (e.g. >20 Hz) and subjected to image shift and image rotation estimations 12 for feeding into one embodiment of the super resolution module 14 running the super resolution algorithm according to the principles of the present disclosure. In certain embodiments, a conjugate gradient with parallelized computation of the sparse matrix is used to produce the output from the super resolution module—a higher resolution image 16, from the common super resolution image frame. It is to be understood that the system supports virtually any frame rate, it just limits the number of frames to effectively be used by the algorithm and/or makes the algorithm perform better or worse. This is same with the number of frames. All things being equal the more frames the better particularly under lower SNR conditions. As noted previously, SNR here can be equated to CNR as is noticeable in the figures to follow.

Referring to FIG. 2, one embodiment of the super resolution formulation of the present disclosure is shown. More specifically, one advantage of this formulation is the optimization criteria (J). While the method can be computationally intensive, the iterative solution of the present disclosure is well suited for real-time operation and parallelized processing. In one embodiment, conjugate gradient least-squares is used to solve the inverse because it is efficient at solving ill-conditioned problems. The system of the present disclosure is best applied on multi-frame, small regions (e.g. cars) or an operator zoom window. In some cases, computation of the H Matrix, which is sparse yet computationally costly, is parallelized.

Figure 3:
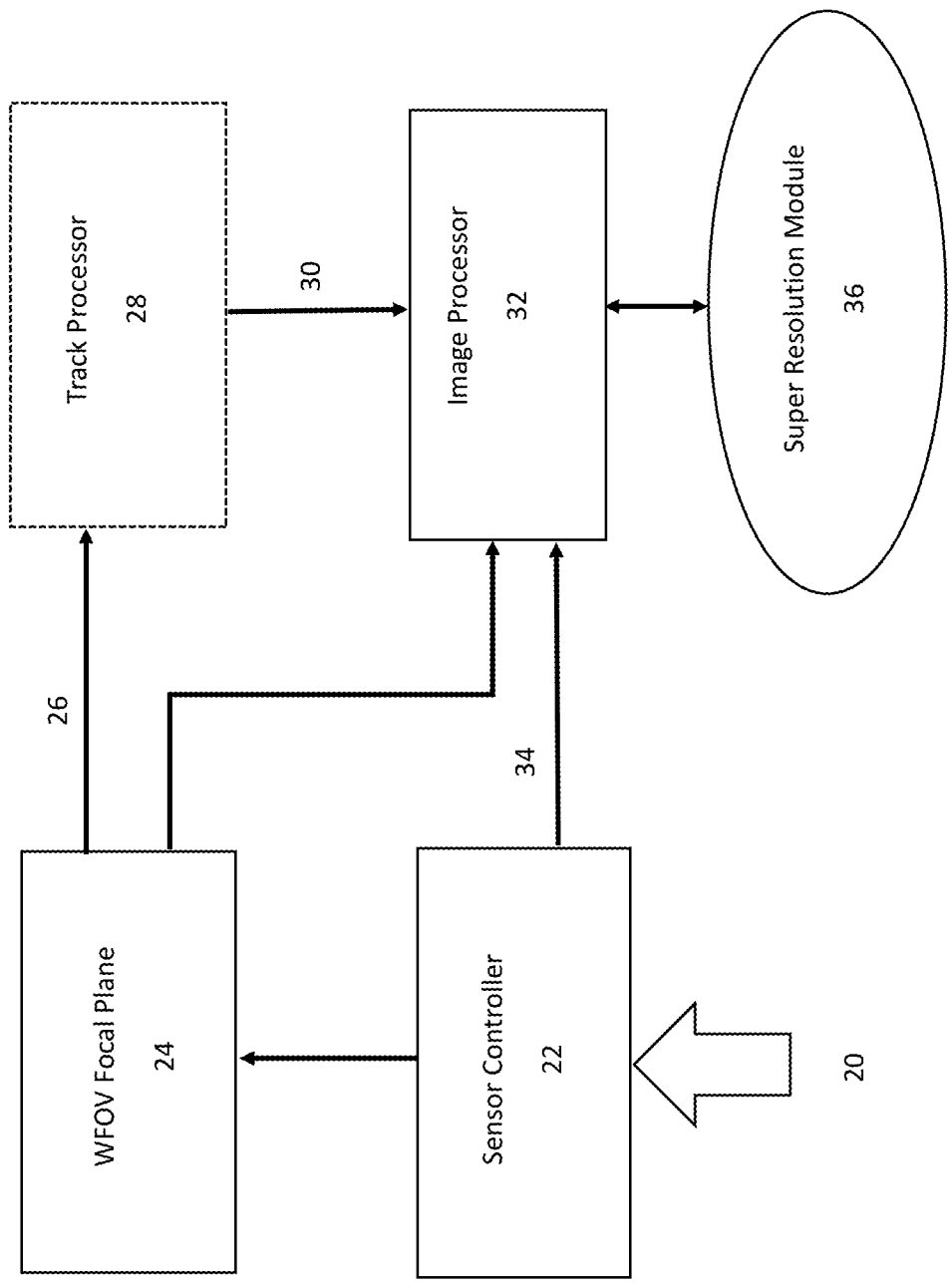
FIG. 3 is a diagram of one embodiment of the super resolution system of the present disclosure.

Referring to FIG. 3, a diagram of one embodiment of the super resolution system of the present disclosure is shown. More specifically, a user-defined region of interest 20 is selected and fed into a sensor controller 22 configured to control: image stabilization, the frame rate over the field of view (FOV), and micro-toggling of the fast steering mirror (FSM). In certain embodiments, the user can supply their own tracking software (i.e. that detects and follows moving vehicles), which can identify objects and areas of interest, or the user can command the sensor to collect data at a high frame rate over an area of interest, and super resolution can be performed there. In some embodiments, frame revisit rates are >about 2 Hz. In certain embodiments, the sensor controller is configured to interact with the wide field of view (WFOV) focal plane 24 for controlling a large format array and the FSM. In some cases, the wide WFOV is >5°. Raw frames with meta data 26 are then fed into a track processor 28. The track processor outputs detected image chips 30 to an image processor 32 comprising a GPU and an FPGA, for example. The sensor controller is configured to interact with the image processor regarding the region of interest data 34. The image processor utilizes one embodiment of the super resolution module approach of the present disclosure 36 for frame-to-frame registration and a parallelized sparse matrix creation with conjugate gradient inversion. The present super resolution system has been tested against both simulated and measured data as the mathematics have been developed and the algorithm coded. In certain embodiments, the system is used in real-time.

Figures 4A, 4B, 4C:
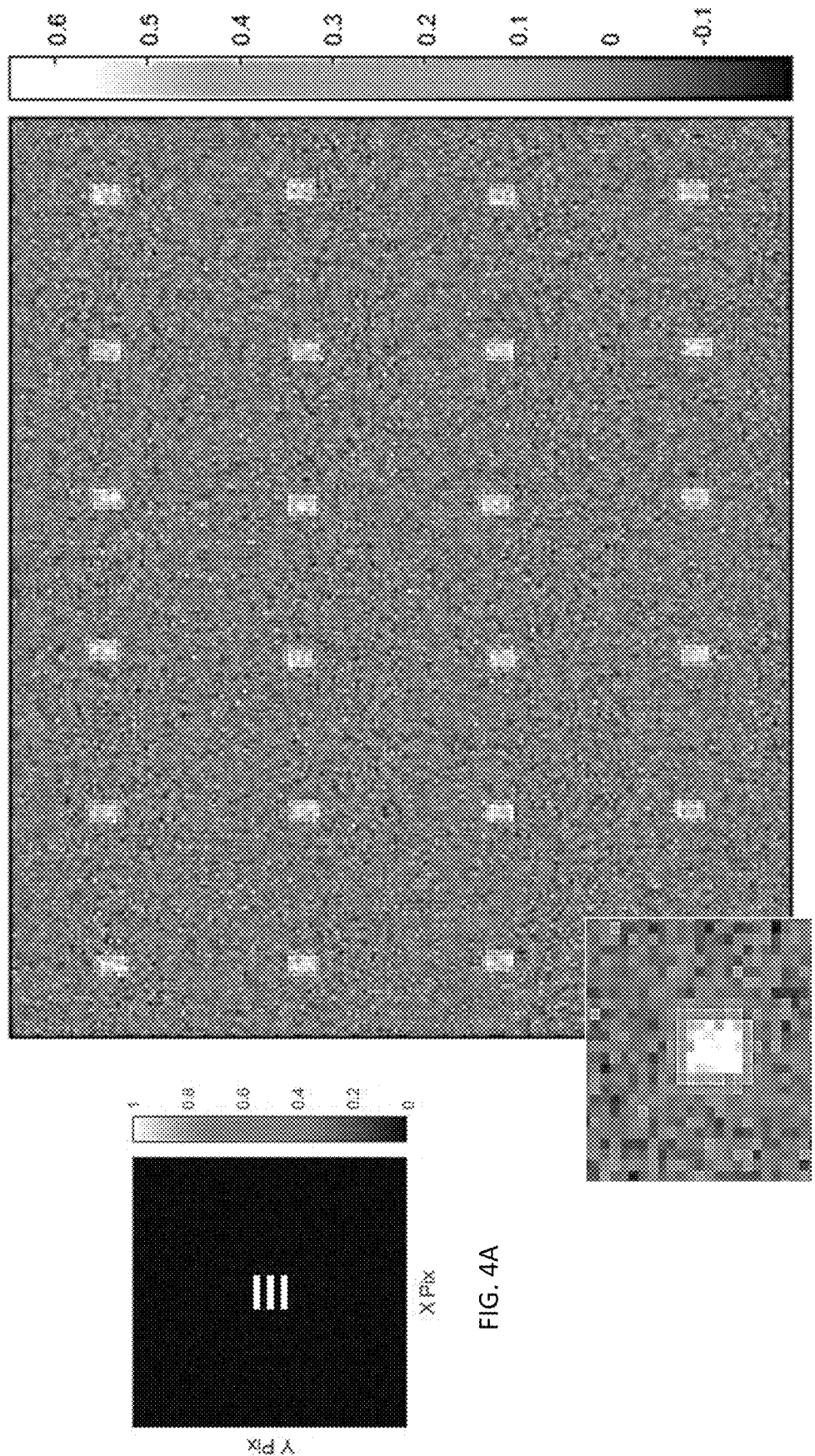
FIG. 4A shows a high-resolution image used in a simulation to generate low resolution images that are processed by one embodiment of the super resolution concept of this present disclosure.
FIG. 4B shows twenty-four, simulated low resolution frames that were processed using one embodiment of the super resolution algorithm of the present disclosure.
FIG. 4C shows one of the twenty-four frames zoomed in as they are being progressively processed using one embodiment of the super resolution algorithm of the present disclosure.
Figure 5B:
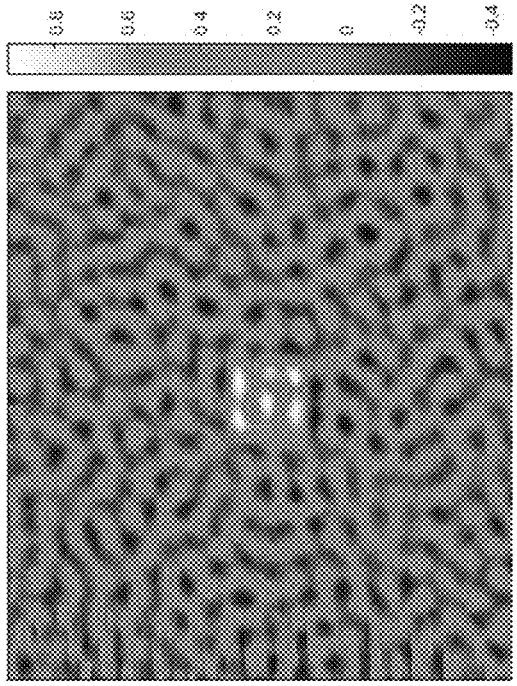
FIG. 5A-FIG. 5D show one, six, twelve, and twenty-four frames, respectively, that have been processed using one embodiment of the super resolution algorithm of the present disclosure.
Figure 5D:
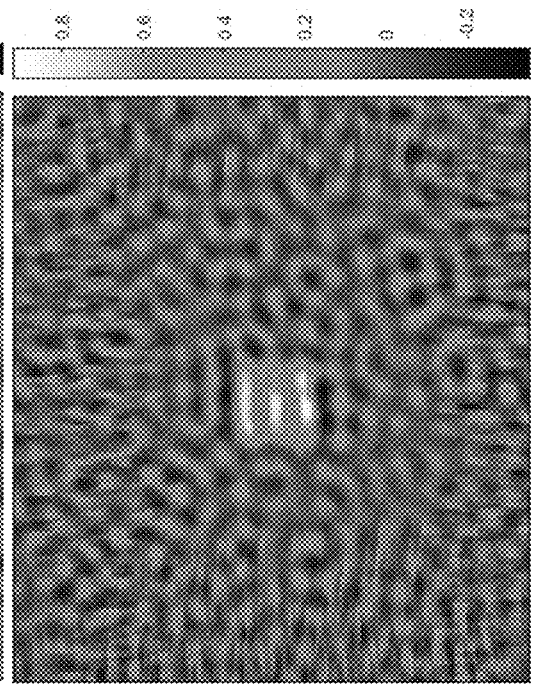
Figure 5A:
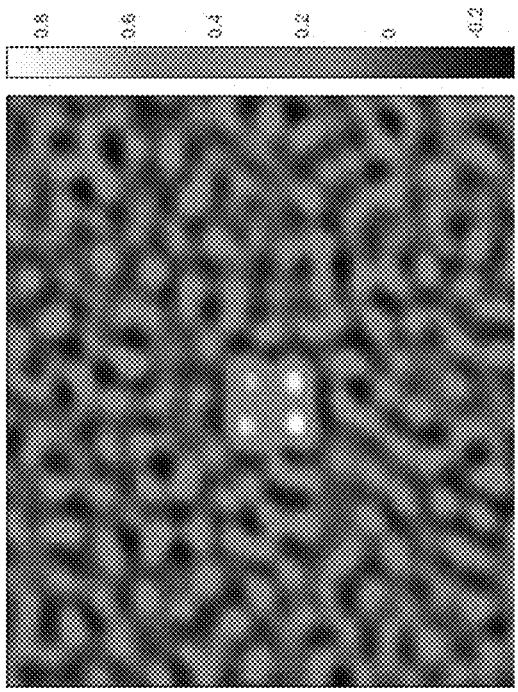
Figure 5C:
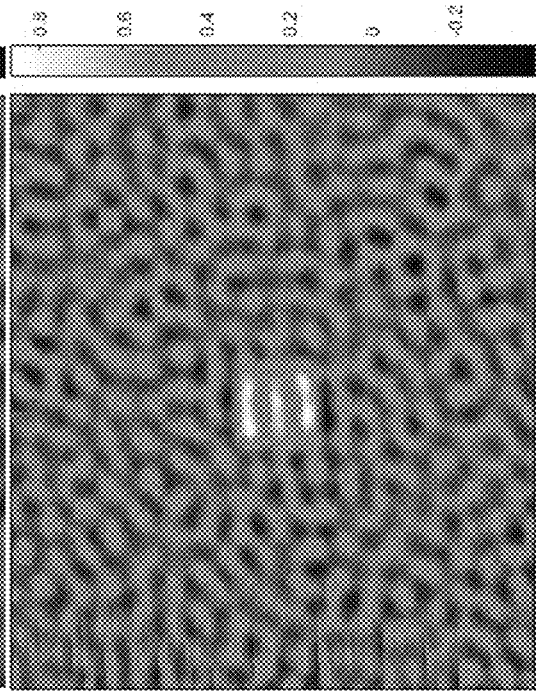

Referring to FIG. 4A, a high-resolution image used in a simulation to generate low resolution images, that are processed by one embodiment of the super resolution process of this present disclosure is shown. More specifically, a simulation was conducted with a SNR (or CNR) of twenty and random image shifts of +/−1.5 pixels and random rotations of +/−1.5 degrees. Referring to FIG. 4B, twenty-four frames as they were progressively processed using one embodiment of the super resolution algorithm of the present disclosure are shown. Referring to FIG. 4C, one of the twenty-four frames zoomed in as they were progressively processed using one embodiment of the super resolution algorithm of the present disclosure is shown. More specifically, the three bars are not resolvable in individual frames, but with six or more frames the bars can be resolved using the super resolution techniques discussed herein according to the principles of the present disclosure. Here, results improved with 12 or more frames. Similar results can be achieved at lower CNR by combining more frames using super resolution module of the present disclosure.

Referring to FIG. 5A-FIG. 5D, one, six, twelve, and twenty-four frames, respectively, that were processed using one embodiment of the super resolution algorithm of the present disclosure are shown. More specifically, with one frame (FIG. 5A), the bars are not resolvable. By six frames (FIG. 5B), the bars are beginning to become resolvable. By twelve frames (FIG. 5C), the bars are resolvable. By twenty-four frames (FIG. 5D), the bars are easily resolvable.

Other simulations were conducted using a high-resolution reference image of a multi-wheeled vehicle to generate twenty multiple low-resolution frames with noise that are typical of what the sensor would produce (e.g., 500 electrons). There, the super resolution module combined coarse frames to produce a higher resolution image where the individual tires were clearly seen with five or more frames, the vehicle shape was clearer, and background features were easier to identify.

Another simulation with higher noise levels (e.g., 1000 electrons) for the same multi-wheeled vehicle was also conducted. With a higher noise level, the tires could not be easily distinguished by processing only a few frames, but six or more frames fed into the super resolution module improved the results and finer details could again be resolved.

Figure 6C:
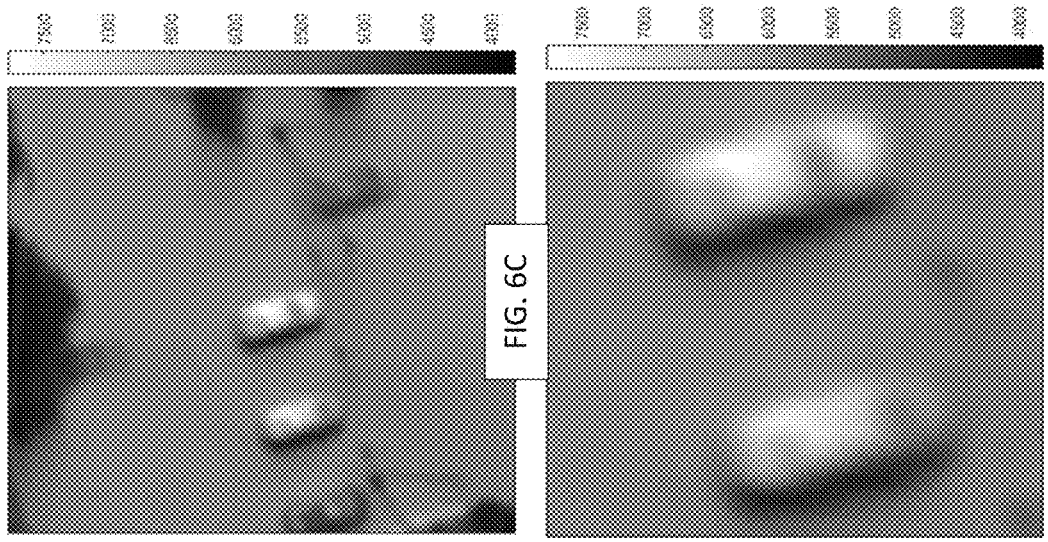
FIG. 6A—FIG. 6C show images of multiple stationary vehicles zoomed in and up-sampled raw, raw, and a super resolution, respectively, according to the principles of the present disclosure applied to measured data from an actual mid-wave infrared (MWIR) wide area motion imagery (WAMI) sensor.
Figure 6B:
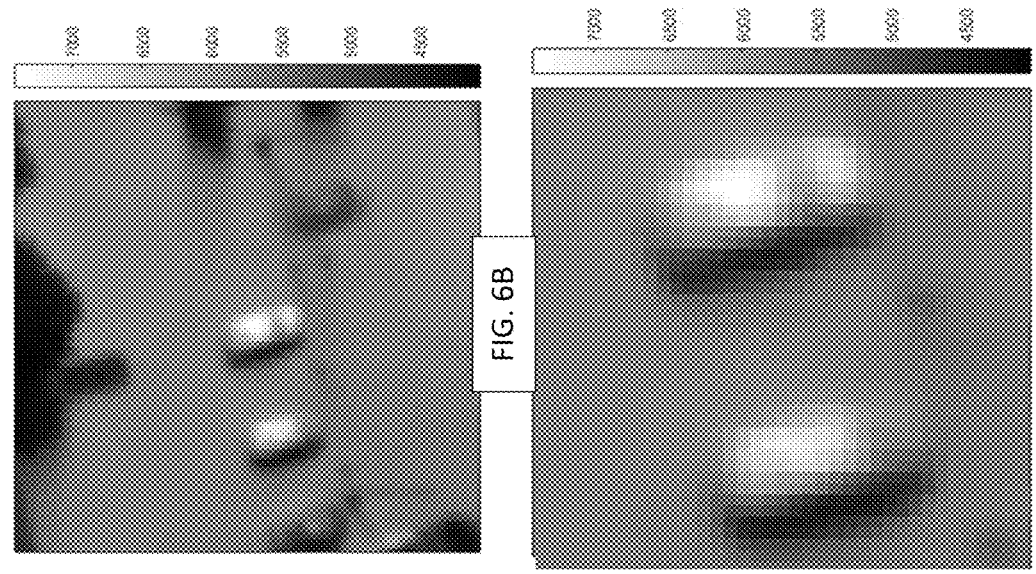
Figure 6A:
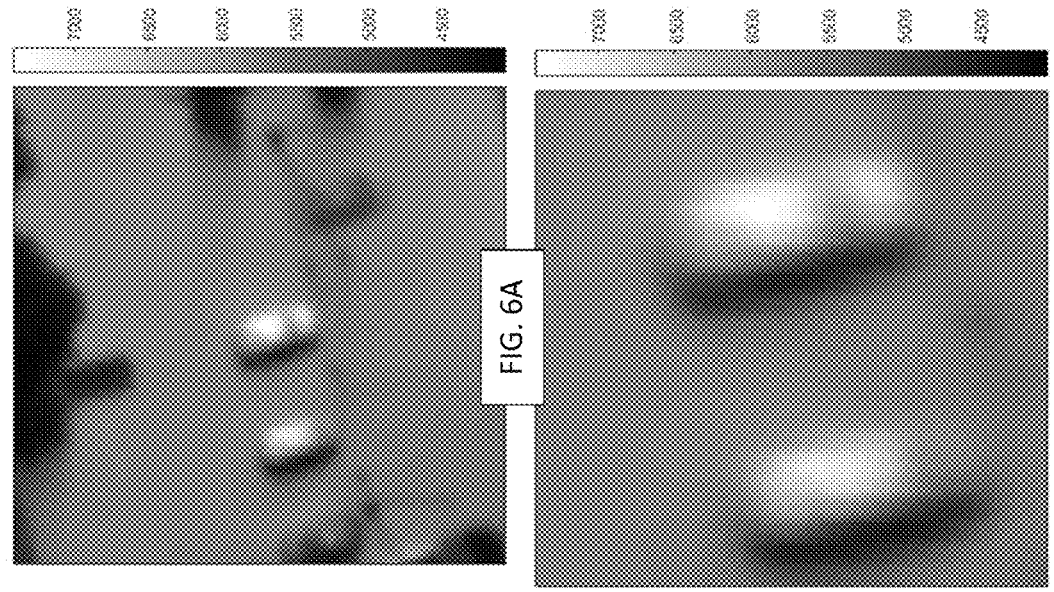

Further testing applied super resolution to actual measurements produced by a mid-wave infrared (MWIR) wide area motion imagery (WAMI) sensor. Since the existing sensor was not designed to support a higher frame (>2 Hz) the number of frames that could be combined by the algorithm was limited. As such, this test was a lower bound on performance and more of a proof of principle. In a first example, images of multiple stationary vehicles using MWIR were processed. Referring to FIG. 6A-FIG. 6C, images of multiple stationary vehicles for an up-sampled single frame raw image, a single frame raw image, and a common super resolution image frame produced by combining four frames, respectively, according to the principles of the present disclosure are shown. More specifically, FIG. 6A shows from top to bottom not zoomed and zoomed, respectively, for raw up-sampled images. FIG. 6B shows from top to bottom not zoomed and zoomed, respectively, raw images. FIG. 6C shows from top to bottom not zoomed and zoomed, respectively, an image processed with the super resolution module according to the principles of the present disclosure. The super resolution processing tightens up the image by providing a significant increase in contrast in the image to provide for higher resolution. For example, the rear window on the vehicle to the right in the figure is more apparent in the resulting super resolution image.

Figure 7A:
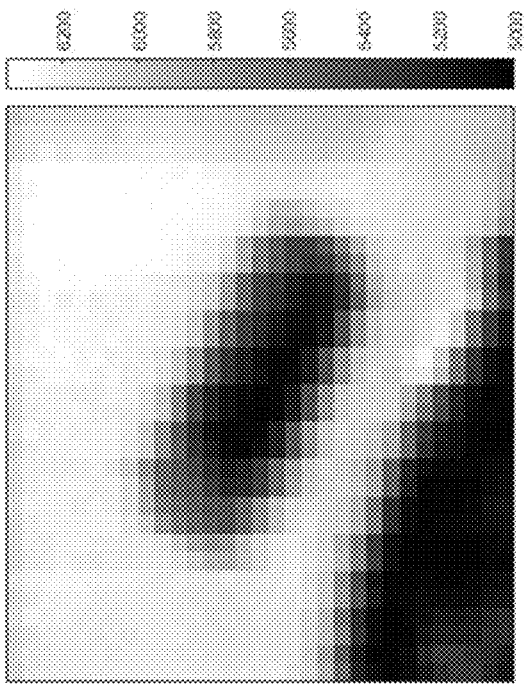
FIG. 7A—FIG. 7C show images of a single moving vehicle as up-sampled raw, raw, and a super resolution, respectively, according to the principles of the present disclosure applied to measured data from an actual wide area motion imagery (WAMI) sensor.
Figure 7B:
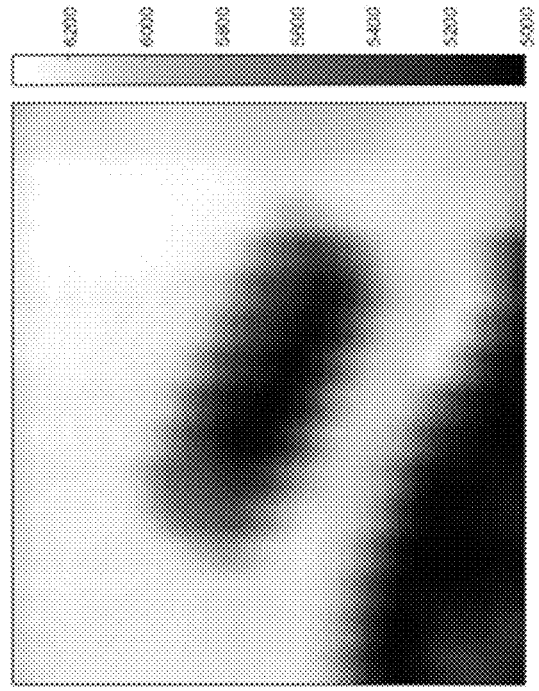
Figure 7C:
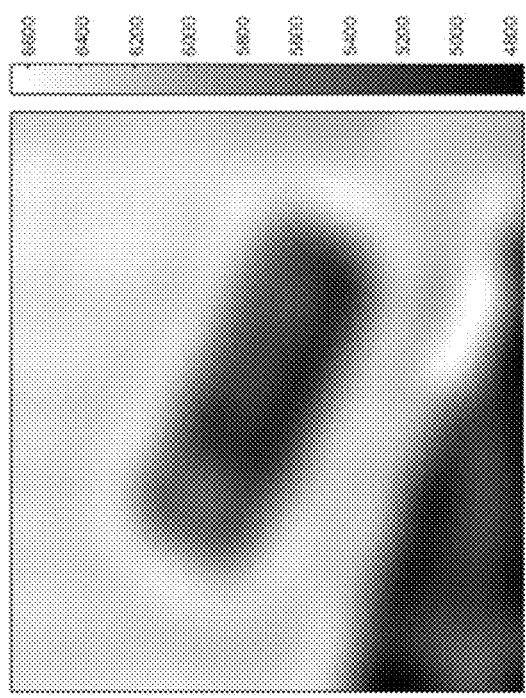

In a second example, a moving vehicle is captured using the same WAMI MWIR sensor as in the previous example. There, the platform flew in a circular orbit. Vehicle shifts and rotations were estimated even as the vehicle was moving. There, the background was uniform, which enabled reasonable estimation. In this embodiment, the super resolution approach as described herein sharpened the image such that the truck shape/features were more visible in the super resolution image. The super resolution algorithm sharpened the image better than simply up-sampling raw data. Referring to FIG. 7A, a raw image of a single frame is shown. Referring to FIG. 7B, an up-sampled raw image is shown. Referring to FIG. 7C the super resolution image that was produced according to the principles of the present disclosure is shown. A noticeable increase in contrast and detail is present.

Referring to FIG. 8, a flowchart of one embodiment of a method of using one embodiment of the real-time super resolution system at long standoff ranges according to the principles of the present disclosure is shown. More specifically, a set of image frames is first collected for processing 100. The frames can be collected either by a user specifying an area-of-interest (AOI) to be processed, or via a user-supplied, automated algorithm that assembles detections on objects of interest over time, along with their associated image chips. In the case where the user defines an AOI, an FSM can be used to steer the FOV to the desired area. If desired, the FSM can also be dithered to produce an optimal strategy for collecting diverse projections over the collected frames. Also, in the user defined AOI mode, the total FOV of the sensor can be cut down enabling a higher sample rate, if desired.

Still referring to FIG. 8, once the sequence of frames is assembled, shift, rotation, and zoom factors are estimated across the various frames 102. These estimated parameters are then used to generate a matrix 104 that maps the focal plane image frames to a common super resolution frame. This is typically a time-consuming process, but by using parallel processing and sensor hardware, real-time generation is possible. In one embodiment of the present disclosure, the inverse of an exceptionally large but sparse matrix that relates the super resolution image points to the measured pixel intensities (and includes mitigating the impact of bad pixels) is used. In some cases, conjugate gradient methods are used to invert the matrix 106 to produce a super resolution image.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A system for producing increased resolution wide area motion images, comprising:
   a focal plane array, configured for collection of a plurality of focal plane images;
   a fast steering mirror configured to steer an image field of view to an area of interest; and
   a super resolution module, configured to:
   estimate shifts, rotations, and zooms between each image in the plurality of focal plane images about the area of interest;
   generate a matrix that relates the plurality of focal plane images to a common super resolution image frame;
   invert the matrix and mitigate impact of any bad pixels on image quality; and
   produce a super resolution image of the area of interest in real-time and at a long standoff distance.

2. The system for producing increased resolution wide area motion images according to claim 1, wherein a long standoff distance is about 20 nautical miles.

3. The system for producing increased resolution wide area motion images according to claim 1, wherein the focal plane array is a large format array configured for use in a mid-wave infrared range.

4. The system for producing increased resolution wide area motion images according to claim 1, wherein the focal plane array is configured for day/night detection.

5. The system for producing increased resolution wide area motion images according to claim 1, wherein the focal plane array is configured for collection of multiple frames on multiple objects from a user supplied tracking algorithm.

6. The system for producing increased resolution wide area motion images according to claim 1, wherein the fast steering mirror is configured to dither the focal plane array to collect diverse projections on an object in the area of interest.

7. The system for producing increased resolution wide area motion images according to claim 1, wherein the focal plane array is configured for higher sample rates by cutting down its field of view.

8. The system for producing increased resolution wide area motion images according to claim 1, wherein GPU/FPGA hardware implements generation of the matrix in real-time using parallel processing.

9. The system for producing increased resolution wide area motion images according to claim 1, further comprising a user interface to allow for selection of the area of interest and a desired frame rate.

10. The system for producing increased resolution wide area motion images according to claim 1, further comprising an application programming interface that allows a user to provide an automated tracking algorithm to assemble detections and small image chips on objects of interest.

11. A method for real-time super resolution processing, comprising:
    collecting a plurality of focal plane image frames of an area of interest;
    estimating shift, rotation, and zoom factors across the plurality of image frames;
    generating a matrix that maps the image frames to a common super resolution frame; and
    inverting the matrix to produce a super resolution image at a long standoff distance that mitigates impact of any bad pixels on image quality.

12. The method according to claim 11, wherein the long standoff distance is about 20 nautical miles.

13. The method according to claim 11, wherein the focal plane image frames are collected via a large format array configured for use in a mid-wave infrared range.

14. The method according to claim 11, wherein the focal plane image frames are collected via a large format array configured for day/night detection.

15. The method according to claim 11, wherein the image frames are collected either by a user specifying an area-of-interest to be processed, or via a user-supplied, automated algorithm that assembles detections on objects of interest over time, along with their associated image chips.

16. The method according to claim 11, wherein a focal plane array is configured for collection of multiple frames on multiple objects using a user supplied tracking algorithm.

17. The method according to claim 11, further comprising steering an image field of view to a user specified area of interest using a fast steering mirror.

18. The method according to claim 11, wherein a fast steering mirror is configured to dither a focal plane array to collect diverse projections on an object in the area of interest.

19. The method according to claim 13, wherein the large format array is configured for higher sample rates by cutting down its field of view.

20. The method according to claim 11, further comprising providing an application programming interface that allows a user to provide an automated tracking algorithm to assemble detections and small image chips on objects of interest.

\* \* \* \* \*